United States Patent [19]

Marianowski et al.

[11] Patent Number: 4,963,442
[45] Date of Patent: Oct. 16, 1990

[54] INTERNAL MANIFOLDED MOLTEN CARBONATE FUEL CELL STACK

[75] Inventors: Leonard G. Marianowski, Mount Prospect, Ill.; Randy J. Petri, Highland, Ind.

[73] Assignee: Institute of Gas Technology, Chicago, Ill.

[21] Appl. No.: 346,666

[22] Filed: May 3, 1989

[51] Int. Cl.$^5$ .................. H01M 2/08; H01M 8/14
[52] U.S. Cl. ..................................... 429/13; 429/16; 429/35; 429/39
[58] Field of Search ............... 429/16, 34, 35, 38, 429/39, 13

[56] References Cited

U.S. PATENT DOCUMENTS

| | | |
|---|---|---|
| 3,514,333 | 5/1970 | Novack . |
| 3,723,186 | 3/1973 | Borucka et al. . |
| 3,867,206 | 2/1975 | Trocciola et al. ............ 429/35 |
| 4,160,067 | 7/1979 | Camara et al. ............ 429/16 |
| 4,259,389 | 3/1981 | Vine et al. ............ 429/36 X |
| 4,329,403 | 5/1982 | Baker ............ 429/35 |
| 4,579,788 | 4/1986 | Marianowski et al. ............ 429/16 |
| 4,761,348 | 8/1988 | Kunz et al. ............ 429/35 |
| 4,781,727 | 11/1988 | Mitsuda et al. ............ 429/35 X |
| 4,786,568 | 11/1988 | Elmore et al. ............ 429/35 X |
| 4,824,739 | 4/1989 | Breault et al. ............ 429/13 |

OTHER PUBLICATIONS

"Modern Designs for Effective Heat Transfer," American Heat Reclaiming Corp., 1270 Avenue of the Americas, New York, N.Y. 10020.
"Superchanger Plate and Frame Heat Exchanger," Tranter, Inc., Wichita Falls, Tex. 76307.

Primary Examiner—Anthony Skapars
Attorney, Agent, or Firm—Thomas W. Speckman; Douglas H. Pauley

[57] ABSTRACT

A fully internally manifolded molten carbonate fuel cell stack is provided by each separator plate and electrolyte in the fuel cell stack having an aligned perforation in each corner area forming a gas manifold extending for the length of the cell stack. Each perforation through the separator plate is surrounded by a flattened manifold wet seal structure extending to contact the electrolytes on each side of the separator plates to form a separator plate/electrolyte wet seal under cell operating conditions. This forms a gas manifold at each corner area extending through the cell stack and conduits through the extended manifold wet seal structure provides gas communication between one of the manifolds at each end of the separator plates and the anode chambers on one side of the separator plates and conduits through the extended manifold wet seal structure on the opposite side of the separator plates provides gas communication between the other of the manifolds at each end of the separator plates and the cathode chambers on the other side of the separator plates. This structure provides fully internal manifolding of and separation of fuel and oxidant gases to each of the unit fuel cells in the fuel cell stack.

20 Claims, 2 Drawing Sheets

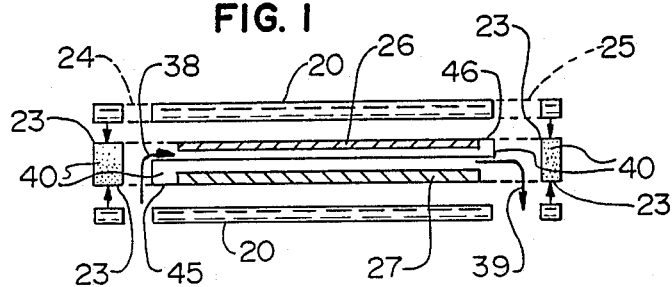
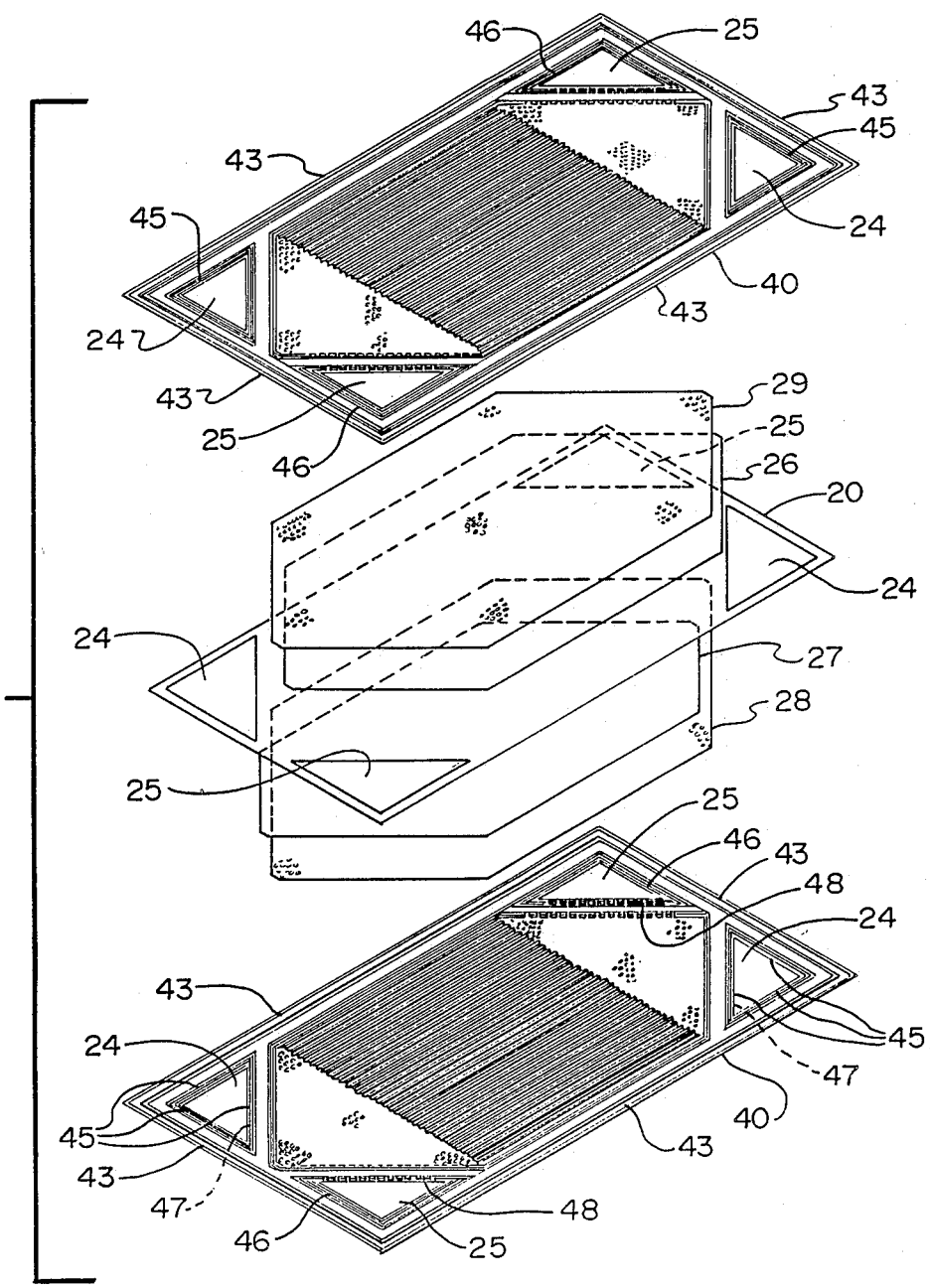

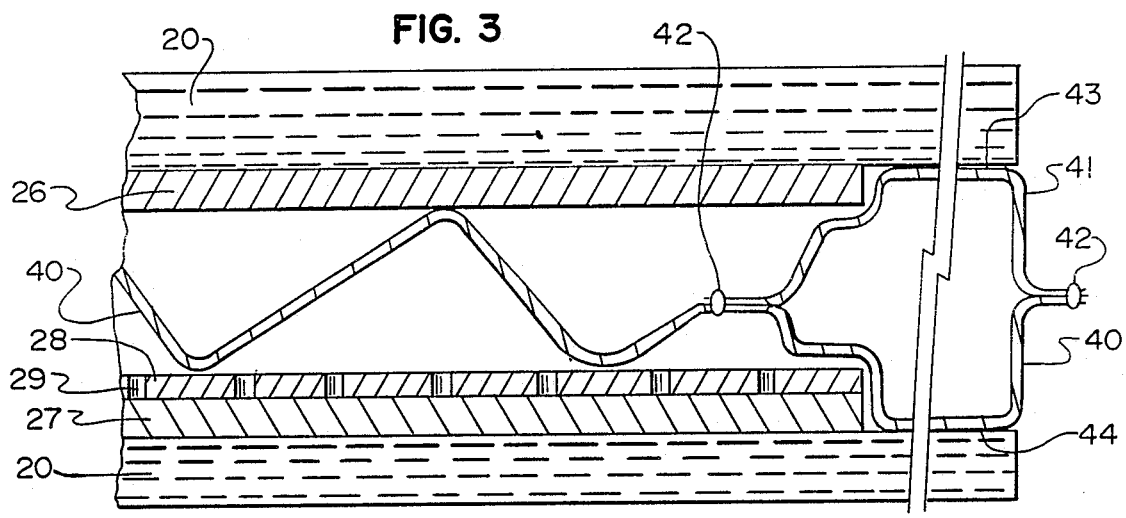
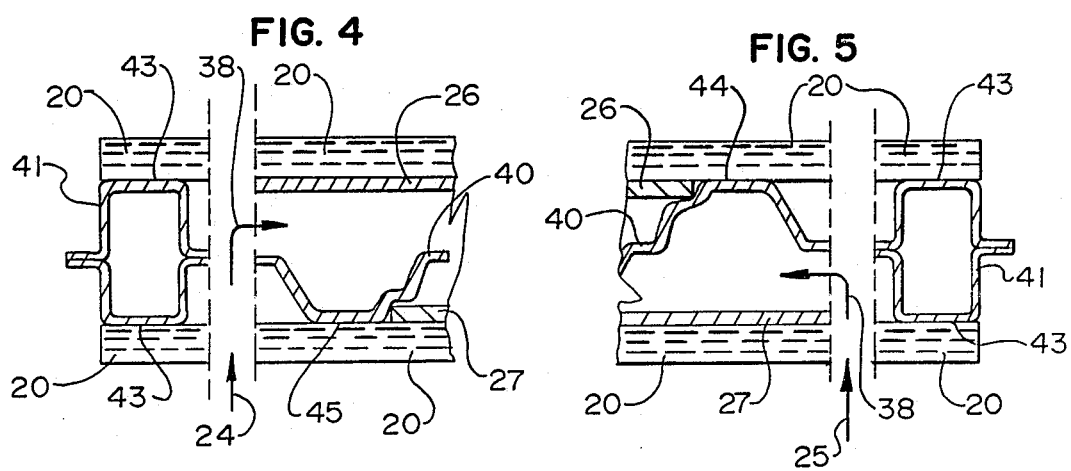

INTERNAL MANIFOLDED MOLTEN CARBONATE FUEL CELL STACK

BACKGROUND OF THE INVENTION

1. Field of the Invention

This invention relates to internally manifolded molten carbonate fuel cell stacks, and in particular, a method and process for sealing fully internally manifolded cell stacks with conventional wet seals between the electrolyte and metallic separator plates to provide long term stability.

Generally, fuel cell electrical output units are comprised of a stacked multiplicity of individual cells separated by inert or bi-polar ferrous metal separator plates. Individual cells are sandwiched together and secured into a single stacked unit to achieve desired fuel cell energy output. Each individual cell generally includes an anode and cathode electrode, a common electrolyte tile, and a fuel and oxidant gas source. Both fuel and oxidant gas are introduced through manifolds to their respective reactant chambers between the separator plate and the electrolyte tile. The area of contact between the electrolyte and the separator plate is known as the wet seal and must maintain separation of the fuel and oxidant gases and prevent and/or minimize overboard gas leakage. A major factor attributing to premature fuel cell failure is corrosion and fatigue in the wet seal area. This failure is hastened by corrosive electrolyte contact at high temperatures and high thermal stresses resulting from large temperature variations during thermal cycling of the cell causing weakening of the structure through intracrystalline and transcrystalline cracking. Such failures permit undesired fuel and/or oxidant gas crossover and overboard gas leakage which interrupts the intended oxidation and reduction reactions thereby causing breakdown and eventual stoppage of cell current generation. Under fuel cell operating conditions, in the range of about 500° to 700° C., molten carbonate electrolytes are very corrosive to ferrous metals which, due to their strength, are required for fuel cell housings and separator plates. The high temperature operation of stacks of molten carbonate fuel cells increases both the corrosion and thermal stress problems in the wet seal area, especially when the thermal coefficients of expansion of adjacent materials are different.

This invention provides fully internal manifolding of the fuel and oxidant gases to the individual cells of an assembled stack in a manner utilizing conventional electrolyte/metal wet seals which, due to the design of the cell components, provides long term endurance and stability of fuel cell operation.

2. Description of the Prior Art

Commercially viable molten carbonate fuel cell stacks may contain up to about 600 individual cells each having a planar area in the order of eight square feet. In stacking such individual cells, separator plates separate the individual cells with fuel and oxidant each being introduced between a set of separator plates, the fuel being introduced between one separator plate and the anode side of the electrolyte matrix and oxidant being introduced between the second separator plate and the cathode side of the electrolyte matrix.

The emphasis in fuel cell development has been in external manifolding of the fuel and oxidant gases by using channel manifolds physically separable from the fuel cell stack. However, the inlets and outlets of each cell must be open to the respective inlet and outlet manifolds which must be clamped onto the exterior of the cell stack. To prevent electrical shorting, insulation must be used between the metal manifolds and the cell stack. External manifolding has presented serious problems in maintaining adequate gas seals at the manifold/manifold gasket/cell stack interface while preventing carbonate pumping within the gasket along the potential gradient of the cell stack. Various combinations of insulating the metal manifold from the cell stack have been used, but with the difficulty of providing a sliding seal which is gas tight and electrically insulating while being carbonate impermeable under high temperature molten carbonate fuel cell operating conditions; no satisfactory solution has been found. The problem of manifolding and sealing becomes more severe when larger number of cells and larger planar areas are used in the cell stack. When greater number of cells are used, the electrical potential driving the carbonate in the seal area along the height of the stack increases, and when the planar area of the cell increases, the linear tolerances of each component and the side alignment of each component becomes extremely difficult to maintain in order to maintain the mating surface sealed between the manifold/manifold gasket/and cell stack.

Cell stacks containing 600 cells can be approximately 10 feet tall presenting serious problems of required stiffness of external manifolds and the application of a clamping force required to force the manifold onto the cell stack. Due to the thermal gradients between cell assembly and cell operating conditions, differential thermal expansions, and the necessary strength of materials used for the manifolds, close tolerances and very difficult engineering problems are presented.

Conventionally, stacks of individual molten carbonate fuel cells have been constructed with spacer strips around the periphery of a separator plate to form wet seals and to provide intake and exhaust manifolds. Various means of sealing in the environment of the high temperature fuel cell wet seal area are disclosed in U.S. Pat. No. 4,579,788 teaching the wet seal strips are fabricated utilizing powder metallurgy techniques; U.S. Pat. No. 3,723,186 teaching the electrolyte itself is comprised of inert materials in regions around its periphery to establish an inert peripheral seal between the electrolyte and housing; U.S. Pat. No. 4,160,067 teaching deposition of inert materials onto or impregnated into the fuel cell housing or separator in wet seal areas; U.S. Pat. No. 4,329,403 teaching graded composition for more gradual transition in the coefficient of thermal expansion in going from the electrodes to the inner electrolyte region; and U.S. Pat. No. 3,514,333 teaching housing of alkali metal carbonate electrolytes in high temperature fuel cells by use of a thin aluminum sealing gasket. The solution of sealing and corrosion problems encountered in low temperature electrolytic cells, such as bonding granular inert material with polytetrafluorethylene as taught by U.S. Pat. No. 4,259,389 is not suitable for high temperature molten carbonate fuel cells.

Internal manifolding has been attempted wherein multiple manifold holes along opposite edges of the cell have been used to provide either co- or counter-current flow of fuel and oxidant gases. These manifold holes have been located in a broadened peripheral wet seal area along opposing edges. However, adjacent manifold holes are used for fuel and oxidant which provides short paths across a short wet seal area and leakage of the gases as well as the necessarily broadened peripheral seal area undesirably reduced the cell active area. Likewise, prior attempts to provide internal manifolding have used multiple manifold holes along broadened peripheral wet seal areas on each of all four edges of the cell to provide cross flow, but again short paths between adjacent fuel and oxidant manifold holes caused leakage of the gases and further reduced the cell active area.

SUMMARY OF THE INVENTION

This invention provides fully internally manifolded molten carbonate fuel cell stacks. In a generally rectangular molten carbonate fuel cell stack a plurality of molten carbonate fuel cell units, each fuel cell unit comprising an anode and a cathode, an alkali metal carbonates electrolyte in contact with one side of the anode and an alkali metal carbonates electrolyte in contact with an opposite facing side of the cathode, and a separator plate separating tthe cell unit between the anode and cathode forming an anode chamber between one side of the separator plate and the anode and a cathode chamber between the opposite side of the separator plate and the cathode. The fuel cell units are stacked and provided with end plates having the same configuration as the separator plates forming half cells at each end and clamped to provide rigid structure to the fuel cell stack. In the fuel cell stacks of this invention, the electrolytes and separator plates extend to the edge of the fuel cell stack, the separator plates having a flattened peripheral wet seal structure extending to contact the electrolytes on each side of the separator plates completely around their periphery forming a separator plate/electrolyte wet seal under cell operating conditions.

The electrolytes and separator plates each have an aligned perforation in each corner area, each separator plate perforation being surrounded by a flattened manifold wet seal structure extending to contact the electrolytes on each side of the separator plates forming a separator plate/electrolyte wet seal under cell operating conditions to form a gas manifold in each corner area extending through the cell stack. Conduits through the extended manifold wet seal structure provide gas communication between one of the manifolds at each end of the separator plates and the anode chambers on one side of the separator plates and conduits through the extended manifold wet seal structure provide gas communications between the other of the manifolds at each end of the separator plates and the cathode chambers on the other side of the separator plates. This structure provides fully internal manifolding of fuel and oxidant gases to each of the unit fuel cells in the fuel cell stack.

The end plates are configured similarly to the separator plates on their inner sides and are provided with means for supply and exhaust from each of the corner manifolds of the fuel cell stack. External means of providing and exhausting fuel gas and oxidant gas to the appropriate manifolds at the end plate connections may be provided by any means known to the art.

In one preferred embodiment, the separator plates in accordance with this invention are pressed metal plates provided with corrugations in the fully active fuel cell area and pressed to form one side of the peripheral and manifold wet seal structures with an upstanding wet seal structure welded to the opposite side of the separator plate to provide peripheral and manifold wet seals on the opposite side of the separator plates. Any structure may be used to provide the extended wet seal areas, such as bars, strips formed by powder metallurgy techniques, and the like.

In a preferred embodiment of this invention, the perforation in each corner of the separator plates and electrolytes is triangular in shape, two sides of the triangle being parallel to the outer edges of the fuel cell stack. It is readily apparent that any other suitable shape may be used and that different sizes and different shapes may be used in each corner area to form manifolds of differing configurations. While each corner perforation is referred to as a single perforation, it may comprise baffling to provide desired gas distribution.

In a preferred embodiment the conduits through the extended manifold wet seal structure providing gas communication between the manifold and the anode and cathode chambers may be openings provided by appropriately corrugated metal or may be holes through sheet metal or bar structures.

This invention provides double wet seals between adjacent gas manifolds which are spaced as far from each other as possible in the rectangular separator plate and electrolyte structure, thereby providing assured sealing of one gas conduit from the adjacent gas conduit. This provides effective means for providing fully internally manifolded gas feed and removal from molten carbonate fuel cell stacks. Use of the structure of this invention also provides effective and varied means for providing carbonate to multi-cell stacks.

This invention provides a mass produceable configuration of the fuel cell components, particularly the separator and its cost effective fabrication. Use of the molten carbonate fuel cell units of this invention provides ease of assembly of the fuel cell stack and modularization for varying sizes of fuel cell stacks.

This invention also provides a process for production of electricity using the fully internally manifolded molten alkali metal carbonates fuel cell stack as described above.

BRIEF DESCRIPTION OF THE DRAWING

Further features of the invention will be apparent from the following detailed description of the invention read in conjunction with the drawing, wherein:

FIG. 1 is a schematic exploded side sectional view of a single cell along a diagonal to illustrate the principles of this invention;

FIG. 2 is an exploded perspective view of a single cell unit of a fuel cell stack in accordance with one embodiment of this invention;

FIG. 3 is a sectional side view of a peripheral wet seal area of a fuel cell according to one embodiment of this invention;

FIG. 4 is a sectional side view of a single cell unit showing opening from a fuel manifold conduit to the anode compartment; and FIG. 5 is a sectional side view of the cell unit shown in FIG. 4 showing opening from an oxidant manifold conduit to the cathode compartment.

DESCRIPTION OF PREFERRED EMBODIMENTS

This invention is directed toward fully internally manifolded fuel cell stacks. In preferred embodiments the electrolyte tile is penetrated by the manifold conduits and in specified areas the electrolyte contacts the separator plate to provide an electrolyte/separator plate peripheral wet seal for containment of fluids within the cell stack and an electrolyte/separator plate manifold seal for isolation of reactant compartments and for direction of fluids into and out of reactant compartments within individual molten carbonate fuel cells. This invention utilizes such internal fluid conduits only in corner manifold areas of the fuel cell stack.

Referring to FIG. 1, a schematic exploded sectional view along a corner to corner diagonal of a single cell of a fuel cell stack according to this invention is shown which provides flow of fuel and oxidant gases fully internal to the cell stack. According to this invention, manifold holes are provided in the corner areas of the electrolyte which extends to the edge of the cell together with the cell separator plates. By contact between the electrolyte and the separator plate on each side forming conventional wet seals on each side around the periphery of the electrolyte, the containment of the fluids is maintained. Through desired openings providing fluid communication between manifold holes and anode and cathode compartments, the desired gaseous flow may be obtained while providing sealing of the manifold holes with conventional electrolyte/separator plate wet seals.

The matching manifold holes in the separator plates and electrolyte tiles form manifold conduits which are continuous for the entire height of the fuel cell stack for gas supply and exhaust. This invention provides that a manifold conduit extending to all cells in a fuel cell stack is supplied from a single external opening, whereas prior externally manifolded fuel cell stacks have required external openings to and from each individual fuel cell. The gases are fed to the fuel cell stack through an end plate which acts as one half of a cell and are exhausted through a similar end plate which acts as another half cell.

The manner in which fluids are fed to and withdrawn from fuel cell stacks can take on a wide variety of variations, the important aspect with respect to the present invention being that gas sealing in the corner manifold areas is accomplished by sealing between the electrolyte tile and the separator plate in the conventional wet seal manner both around the periphery of the separator plate and in the corner gas manifold area as desired for conducting the gas to desired locations within each individual cell.

As shown in FIG. 1, electrolyte 20 and separator plate 40 extend to the outer edge of the cell and are sealed to each other around their periphery in wet seal areas 23. In FIG. 1, the individual molten carbonate fuel cell unit is shown with anode 26 spaced from separator plate 40 to provide an anode chamber fed by fuel manifold hole 24 as indicated by arrow 38. On the other side of separator plate 40 cathode 27 is spaced from separator plate 40 to form a cathode chamber in communication with oxidant manifold holes 25 as indicated by arrow 39. Electrolyte 20 and separator plate 40 extend to the outer edge of the cell forming peripheral wet seal areas 23 which provide conventional peripheral wet seals between the electrolyte and separator plate for containment of fluid. Fuel manifold wet seal area 45 and oxidant wet seal area 46 provide manifold sealing by conventional electrolyte/separator plate wet seals and provide desired direction of fluid to anode and cathode chambers on opposite sides of separator plate 40. No additional gaskets are used for sealing and the cell unit can accommodate a wide variety of carbonate addition techniques, including use of carbonate tapes. When carbonate tapes are used, the carbonate tapes and electrolyte matrix extend to the cell edges and although the inter-cell spacing decreases in proportion to the thickness of the carbonate tapes when they melt, sealing and conformity of all cell components is maintained at all times. During cell heat-up prior to carbonate tape melting, sealing is maintained around each manifold hole 24 and 25 because the carbonate tapes and the electrolyte matrix, such as $LiAlO_2$, extend adjacent to the respective sealing surfaces and contain a rubbery binder. During binder burn-out, which occurs prior to carbonate melt, gas flows are maintained and sealing is obtained. When the binder is burned off and the cell temperature raised to the melting point of the carbonate, the melting carbonate is absorbed by the porous $LiAlO_2$ tape and the electrodes. The inter-cell spacing decreases as the carbonate tapes melt but at all stages from room temperature to operating temperatures of about 650° C. cell sealing is maintained.

FIG. 2 is a perspective exploded view of a fuel cell unit of a molten carbonate fuel cell stack according to one embodiment of this invention with separator plates 40, cathode 27, cathode current collector 28, electrolyte 20, anode 26 and anode current collector 29. Both separator plates 40 and electrolyte 20 extend to the edge of the cell and form wet seals on both sides of separator plate 40 around its entire periphery in peripheral wet seal areas 43. Peripheral wet seal areas 43 are extended both upwardly and downwardly from the general plane of separator plate 40 to provide contact with the periphery of electrolyte 20 on both sides of separator plate 40. Separator plates 40 and electrolyte tiles 20 are both penetrated by corresponding fuel manifold holes 24 and oxidant manifold holes 25. Both separator plates 40 and electrolyte tiles 20 are penetrated only in their corner areas by manifold holes to provide the longest possible spacing between the manifold holes. As shown in FIG. 2, it is preferred to have a manifold hole in each corner of separator plates 40 and electrolyte tiles 20. While the manifold holes shown in FIG. 2 are a preferred triangular shape providing easily formed straight manifold wet seal areas, the manifold holes may be round, rectangular or any other desired shape. The manifold holes shown in FIG. 2 are single openings, but partitions may be used in the single openings as desired to direct gas flow across the cell reactant chambers. Fuel manifold wet seal areas 45 and oxidant manifold wet seal areas 46 are extended both upwardly and downwardly from the general plane of separator plate 40 to provide contact with the electrolyte 20 on both sides of separator plate 40 to form wet seals with the adjacent electrolyte 20 defining the gas conduits. Anode 26 is recessed below the level of peripheral wet seal 43 and oxidant manifold wet seal 46 to provide wet seal contact between separator plate 40 and electrolyte 20 in those areas. On the opposite side of separator plate 40, cathode 27 is recessed to permit peripheral wet seal 43 and fuel manifold wet seal 45 contact between separator plate 40 and electrolyte 20 in those areas.

As best seen in FIG. 2, oxidant manifold holes 25 are sealed by oxidant manifold wet seals 46 providing oxidant flow only to the cathode chamber by oxidant supply openings 48 and preventing gas flow to or from the anode chamber while fuel manifold holes 24 are sealed by fuel manifold wet seals 45 providing fuel flow by fuel supply openings 47 (on the bottom side of separator plate 40) to the anode chamber and preventing gas flow to or from the cathode chamber. While the manifold wet seals are shown as straight pressed sheet metal rails, they can be any desired shape or structure to prevent gas flow. The manifold wet seals form a double wet seal between fuel manifold hole 24 and oxidant manifold hole 25. The fuel and oxidant manifolds by being located in the corner areas of the cell stack are as far physically separated as possible in the generally rectangular cell configuration.

Separator plates 40 may be comprised of suitable materials providing desired physical strength and gas separation. In many cell stacks it is preferred to use bimetallic separator plates in which stainless steel may be used on the cathode side and nickel or copper on the anode side to avoid ferrous metal corrosion. Separator plates may also be fabricated from ferrous alloys, such as type 300 series stainless steel alloys. The separator plates provide the dual function of providing a gas chamber non-reactive separator as well as providing structural strength to the fuel cell as an internal load bearing member. While it is preferred to use separator plates having a corrugated cross-sectional shape to provide both strength and better gas circulation adjacent the electrodes, the principles of this invention are also applicable to flat separator plates structured to provide peripheral wet seal areas and to provide wet seals around internal corner manifold holes while allowing gas to pass to and from the internal manifolds as required for fuel cell operation. The fuel cell stack internal separator plates are desirably very thin sheets, in the order of about 0.010 inch.

Thin stamped stainless steel plates have been used in heat exchange technology as exemplified by the publications "Modern Designs For Effective Heat Transfer," American Heat Reclaiming Corp., 1270 Avenue of the Americas, New York, N.Y. 10020 and "Superchanger Plate and Frame Heat Exchanger," Tranter, Inc. Wichita Falls, Tex. 76307. These heat exchangers use a series of gasketed embossed or pressed metal plates bolted together between end frames to provide channels for passage of hot medium on one side of the plate and passage of cold medium on the other side of the plate. However, fuel cell stack separator plates present very different problems of sealing and corrosion under molten alkali metal carbonates fuel cell operating conditions and different manifold configuration, sealing, and fluid communication means since two fluids must pass in separated relation between adjacent separator plates. In heat exchange, only one fluid passes between adjacent heat exchange plates. However, the technology of fluid flow over the electrodes of the fuel cell stack of this invention may advantageously utilize design techniques and patterns of plate heat exchangers, such as herringbone, washboard, straight corrugations and mixed corrugations.

FIG. 3 shows in more detail a peripheral wet seal area in accordance with one embodiment of this invention wherein separator plate 40 is corrugated with the peaks on one side of the corrugations adjacent cathode 27 support plate 28 with perforations 29 and formed to have flat separator plate seal area 44 which lies adjacent electrolyte 20 on the cathode side of the cell. Separator plate wet seal strip 41 is welded by welds 42, or otherwise attached, to the anode side of separator plate 40 to provide flat separator plate wet seal strip wet seal area 43 which lies adjacent electrolyte 20 on the anode side of the cell. It is readily apparent that the position of the separator plate and the wet seal strip may be reversed and that spacing of separator wet seal strip wet seal area 43 and separator wet seal area 44 may be formed to fit the spacing requirements of individual cells.

FIG. 4 shows in cross-sectional view through a conduit between fuel manifold 24 and the anode chamber the manner in which separator plate fuel manifold wet seal area 45 between the lower side of separator plate 40 and electrolyte 20 prevents fuel flow to the cathode chamber and provides fuel flow to the anode chamber between anode 26 and the upper side of separator plate 40. Likewise, FIG. 5 shows in cross-sectional view through a conduit between oxidant manifold 25 and the cathode chamber the manner in which separator plate oxidant manifold wet seal area 44 between the upper side of separator plate 40 and electrolyte 20 prevents oxidant flow to the anode chamber while providing oxidant flow to the cathode chamber between cathode 27 and the lower side of separator plate 40. The fuel and oxidant passages may be formed by side corrugations in separator plate 40, by holes through a strip fastened to separator plate 40, or by any other means suitable to distribute the gases as desired.

By use of conventional separator plate/electrolyte wet seals, which have been used as peripheral seals in molten carbonate fuel cells, communication between the fuel conduit and only the anode side of the separator plate and between the oxidant conduit and only the opposite cathode side of the separator plate, can be achieved without porous gaskets as are essential when external manifolding is used. Further, each gas conduit seal area will be aluminized to reduce corrosive and other wicking processes.

Using the fully internal manifolding of this invention, the inter-cell changes of distance resulting from melting of the carbonate tapes occurs at the factory assembly site and once such melting occurs there are no further changes in inter-cell distances. Thus the height of the cell stack shipped from the factory will be the same as that during operation in a pressure vessel at the use site. Thus, the only follow up required during fuel cell stack operation is that required to maintain the cell holding force on the active and seal areas.

While in the foregoing specification this invention has been described in relation to certain preferred embodiments thereof, and many details have been set forth for purposes of illustration, it will be apparent to those skilled in the art that the invention is susceptible to additional embodiments.

We claim:

1. In a generally rectangular molten carbonate fuel cell stack comprising a plurality of molten carbonate fuel cell units, each said fuel cell unit comprising an anode and a cathode, an alkali metal carbonates electrolyte in contact with one side of said anode and an alkali metal carbonates electrolyte in contact with an opposite facing side of said cathode, and a separator plate separating said cell unit between said anode and cathode forming an anode chamber between one side of said separator plate and said anode and a cathode chamber between the opposite side of said separator plate and said cathode, the improvement comprising; said electrolytes and said separator plates extending to the edge of said fuel cell stack, said separator plates having a flattened peripheral wet seal structure extending to contact said electrolytes on each side of said separator plates completely around their periphery forming a separator plate/electrolyte wet seal under cell operating conditions, said electrolytes and said separator plates each having an aligned perforation in each corner area, each said perforation being surrounded by a flattened manifold wet seal structure extending to contact said electrolytes on each side of said separator plates forming a separator plate/electrolyte wet seal under cell operating conditions to form a gas manifold in each corner area extending through said cell stack, conduits through said extended manifold wet seal structure providing gas communication between one of said manifolds at each end of said separator plates and said anode chambers on one side of said separator plates and conduits through said extended manifold wet seal structure providing gas communication between the other of said manifolds at each end of said separator plates and said cathode chambers on the other side of said separator plates, thereby providing internal manifolding of fuel and oxidant gases to each said unit fuel cell in said fuel cell stack.

2. In a molten carbonate fuel cell stack according to claim 1 wherein end plates are configured the same as said separator plates on their inner sides and form half cells on each end of said fuel cell stack.

3. In a molten carbonate fuel cell stack according to claim 2 wherein said separator plates are pressed metal plates.

4. In a molten carbonate fuel cell stack according to claim 3 wherein said flattened peripheral wet seal structure comprises a pressed metal shape forming said extended peripheral wet seal welded to one side of said separator plate.

5. In a molten carbonate fuel cell stack according to claim 4 wherein said extended manifold wet seal structure comprises a pressed metal shape forming said extended manifold wet seal welded to one side of said separator plate.

6. In a molten carbonate fuel cell stack according to claim 5 wherein each said perforation is triangular in shape having two sides parallel to the outer edges of said cell stack.

7. In a molten carbonate fuel cell stack according to claim 6 wherein said conduits through said extended manifold wet seal structure are formed by corrugated metal.

8. In a molten carbonate fuel cell stack according to claim 6 wherein said conduits through said extended manifold wet seal structure are holes through sheet metal or bar structures.

9. In a molten carbonate fuel cell stack according to claim 1 wherein said separator plates are pressed metal plates.

10. In a molten carbonate fuel cell stack according to claim 1 wherein said flattened peripheral wet seal structure comprises a pressed metal shape forming said extended peripheral wet seal welded to one side of said separator plate.

11. In a molten carbonate fuel cell stack according to claim 1 wherein said extended manifold wet seal structure comprises a pressed metal shape forming said extended manifold wet seal welded to one side of said separator plate.

12. In a molten carbonate fuel cell stack according to claim 1 wherein each said perforation is triangular in shape having two sides parallel to the outer edges of said cell stack.

13. In a molten carbonate fuel cell stack according to claim 1 wherein said conduits through said extended manifold wet seal structure are formed by corrugated metal.

14. In a molten carbonate fuel cell stack according to claim 1 wherein said conduits through said extended manifold wet seal structure are holes through sheet metal or bar structures.

15. A process for production of electricity in a generally rectangular molten carbonate fuel cell stack comprising a plurality of molten carbonate fuel cell units, each said fuel cell unit comprising an anode and a cathode, an alkali metal carbonates electrolyte in contact with one side of said anode and an alkali metal carbonates electrolyte in contact with an opposite facing side of said cathode, and a separator plate separating said cell unit between said anode and cathode forming an anode chamber between one side of said separator plate and said anode and a cathode chamber between the opposite side of said separator plate and said cathode, the improvement comprising; passing fuel and oxidant gases through fully internal manifold conduits to and from each fuel cell unit in said fuel cell stack, said internal manifold conduits formed by said electrolytes and said separator plates each having an aligned perforation in each corner area, each said perforation being surrounded by a flattened manifold wet seal structure extending to contact said electrolytes on each side of said separator plates forming a separator plate/electrolyte wet seal under cell operating conditions to form a gas manifold in each corner area extending through said cell stack, conduits through said extended manifold wet seal structure providing gas communication between one of said manifolds at each end of said separator plates and said anode chambers on one side of said separator plates and conduits through said extended manifold wet seal structure providing gas communication between the other of said manifolds at each end of said separator plates and said cathode chambers on the other side of said separator plates, thereby providing internal manifolding of fuel and oxidant gases to each said unit fuel cell in said fuel cell stack.

16. A process according to claim 15 wherein said extended manifold wet seal structure comprises a pressed metal shape forming said extended manifold wet seal welded to one side of said separator plate.

17. A process according to claim 15 wherein each said perforation is triangular in shape having two sides parallel to the outer edges of said cell stack.

18. A process according to claim 15 wherein said conduits through said extended manifold wet seal structure are formed by corrugated metal.

19. A process according to claim 15 wherein said conduits through said extended manifold wet seal structure are holes through sheet metal or bar structures.

20. A process according to claim 15 wherein end plates are configured the same as said separator plates on their inner sides and form half cells on each end of said fuel cell stack.

* * * * *